(12) United States Patent
Ma et al.

(10) Patent No.: US 11,582,707 B2
(45) Date of Patent: Feb. 14, 2023

(54) RATE MATCHING FOR SYNCHRONIZATION SIGNAL BLOCK (SSB) TRANSMISSIONS IN NON-TERRESTRIAL NETWORKS (NTN)

(71) Applicant: QUALCOMM Incorporated, San Diego, CA (US)

(72) Inventors: Liangping Ma, San Diego, CA (US); Xiao Feng Wang, San Diego, CA (US); Huilin Xu, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 17/168,702

(22) Filed: Feb. 5, 2021

(65) Prior Publication Data

US 2021/0258897 A1 Aug. 19, 2021

Related U.S. Application Data

(60) Provisional application No. 62/976,244, filed on Feb. 13, 2020.

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0007* (2013.01); *H04L 5/0048* (2013.01); *H04W 72/046* (2013.01); *H04W 72/0453* (2013.01)

(58) Field of Classification Search
CPC .............. H04L 5/0007; H04L 5/0048; H04W 72/0453; H04W 72/046; H04W 72/04; H04W 56/001
(Continued)

(56) References Cited

U.S. PATENT DOCUMENTS

2019/0379506 A1* 12/2019 Cheng ................... H04L 1/0026
2020/0067676 A1* 2/2020 Yi ....................... H04W 72/042
(Continued)

FOREIGN PATENT DOCUMENTS

EP 3606235 A1 2/2020

OTHER PUBLICATIONS

International Search Report and Written Opinion—PCT/US2021/016968—ISA/EPO—dated May 3, 2021.
(Continued)

*Primary Examiner* — Candal Elpenord
(74) *Attorney, Agent, or Firm* — Patterson & Sheridan, L.L.P.

(57) ABSTRACT

Certain aspects of the present disclosure provide techniques for rate matching of synchronization signal block (SSB) transmissions in non-terrestrial networks (NTNs). A method that may be performed by a user equipment (UE) includes receiving configuration information indicating a beam-specific rate matching pattern for at least one beam of a plurality of beams configured for the UE, wherein a SSB transmission corresponding to each of the plurality of beams is configured using the same set of frequencies, receiving a data channel using the at least one beam, and processing the data channel based on the rate matching pattern.

30 Claims, 10 Drawing Sheets

(51) Int. Cl.
*H04W 72/04* (2009.01)
*H04W 72/0453* (2023.01)
*H04W 72/044* (2023.01)

(58) Field of Classification Search
USPC .................................................. 370/329–330
See application file for complete search history.

(56) References Cited

U.S. PATENT DOCUMENTS

2020/0314777 A1* 10/2020 Liu ........................ H04W 72/04
2021/0058949 A1* 2/2021 Kim .................. H04W 72/1268
2022/0104182 A1* 3/2022 Kim ...................... H04L 5/0051
2022/0141780 A1* 5/2022 Harada ............... H04W 56/006
370/503

OTHER PUBLICATIONS

Qualcomm Incorporated: "On NTN Initial Search and Handover", 3GPP Draft, 3GPP TSG RAN WG1 #99, R1-1912958, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823720, 3 Pages.

* cited by examiner

Problem 1: DL data transmission is impossible.

Beam 1 has Overlapping Beam
Footprints with Beams 0, 2 and 3

Problem 2: Interference from Beam 0 Due to Beam 1's overlapping beam footprints with Beams 0, 2 and 3, SSB transmissions of beams 0, 2 and 3 using the common SSB frequency contained in BWP1 interferes with data transmissions on beam 1 using BWP1

RATE MATCHING FOR SYNCHRONIZATION SIGNAL BLOCK (SSB) TRANSMISSIONS IN NON-TERRESTRIAL NETWORKS (NTN)

CROSS-REFERENCE TO RELATED APPLICATION(S)

This application claims benefit of and priority to U.S. Provisional Application No. 62/976,244, filed Feb. 13, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for rate matching a data channel around synchronization signal block (SSB) transmissions in non-terrestrial networks (NTNs).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved techniques for rate matching for SSB transmissions in NTN.

Certain aspects of the subject matter described in this disclosure can be implemented in a method for wireless communication by a user equipment (UE). The method generally includes receiving configuration information indicating a beam-specific rate matching pattern for at least one beam of a plurality of beams configured for the UE, wherein a synchronization signal block (SSB) transmission corresponding to each of the plurality of beams is configured using the same set of frequencies; receiving a data channel using the at least one beam; and processing the data channel based on the rate matching pattern.

Certain aspects of the subject matter described in this disclosure can be implemented in a method for wireless communication by a network entity. The method generally includes determining a beam-specific rate matching pattern for at least one beam of a plurality of beams configured for the UE, wherein a SSB transmission corresponding to each of the plurality of beams is configured using the same set of frequencies; transmitting configuration information indicating the beam-specific rate matching pattern; and transmitting a data channel using the at least one beam based on the rate matching pattern.

Certain aspects of the subject matter described in this disclosure can be implemented in an apparatus for wireless communication by a UE. The apparatus generally includes at least one processor and a memory coupled to the at least one processor. The memory and the at least one processor is generally configured to receive configuration information indicating a beam-specific rate matching pattern for at least one beam of a plurality of beams configured for the UE, wherein a SSB transmission corresponding to each of the plurality of beams is configured using the same set of frequencies; receive a data channel using the at least one beam; and process the data channel based on the rate matching pattern.

Certain aspects of the subject matter described in this disclosure can be implemented in an apparatus for wireless communication by a network entity. The apparatus generally includes at least one processor and a memory coupled to the at least one processor. The memory and the at least one processor is generally configured to determine a beam-specific rate matching pattern for at least one beam of a plurality of beams configured for the UE, wherein a SSB transmission corresponding to each of the plurality of beams is configured using the same set of frequencies; transmit configuration information indicating the beam-specific rate matching pattern; and transmit a data channel using the at least one beam based on the rate matching pattern.

Certain aspects of the subject matter described in this disclosure can be implemented in an apparatus for wireless communication by a UE. The apparatus generally includes means for receiving configuration information indicating a beam-specific rate matching pattern for at least one beam of a plurality of beams configured for the UE, wherein a SSB transmission corresponding to each of the plurality of beams is configured using the same set of frequencies; means for receiving a data channel using the at least one beam; and means for processing the data channel based on the rate matching pattern.

Certain aspects of the subject matter described in this disclosure can be implemented in an apparatus for wireless communication by a network entity. The apparatus generally includes means for determining a beam-specific rate matching pattern for at least one beam of a plurality of beams configured for a user equipment (UE), wherein a synchronization signal block (SSB) transmission corresponding to each of the plurality of beams is configured using the same set of frequencies; means for transmitting configuration information indicating the beam-specific rate matching pattern; and means for transmitting a data channel using the at least one beam based on the rate matching pattern.

Certain aspects of the subject matter described in this disclosure can be implemented in a computer readable medium having computer executable code stored thereon. The computer readable medium having computer executable code stored thereon generally includes code for receiving configuration information indicating a beam-specific rate matching pattern for at least one beam of a plurality of beams configured for the UE, wherein a SSB transmission corresponding to each of the plurality of beams is configured using the same set of frequencies; code for receiving a data channel using the at least one beam; and code for processing the data channel based on the rate matching pattern.

Certain aspects of the subject matter described in this disclosure can be implemented in a computer readable medium having computer executable code stored thereon. The computer readable medium having computer executable code stored thereon generally includes code for determining a beam-specific rate matching pattern for at least one beam of a plurality of beams configured for a user equipment (UE), wherein a synchronization signal block (SSB) transmission corresponding to each of the plurality of beams is configured using the same set of frequencies; code for transmitting configuration information indicating the beam-specific rate matching pattern; and code for transmitting a data channel using the at least one beam based on the rate matching pattern.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
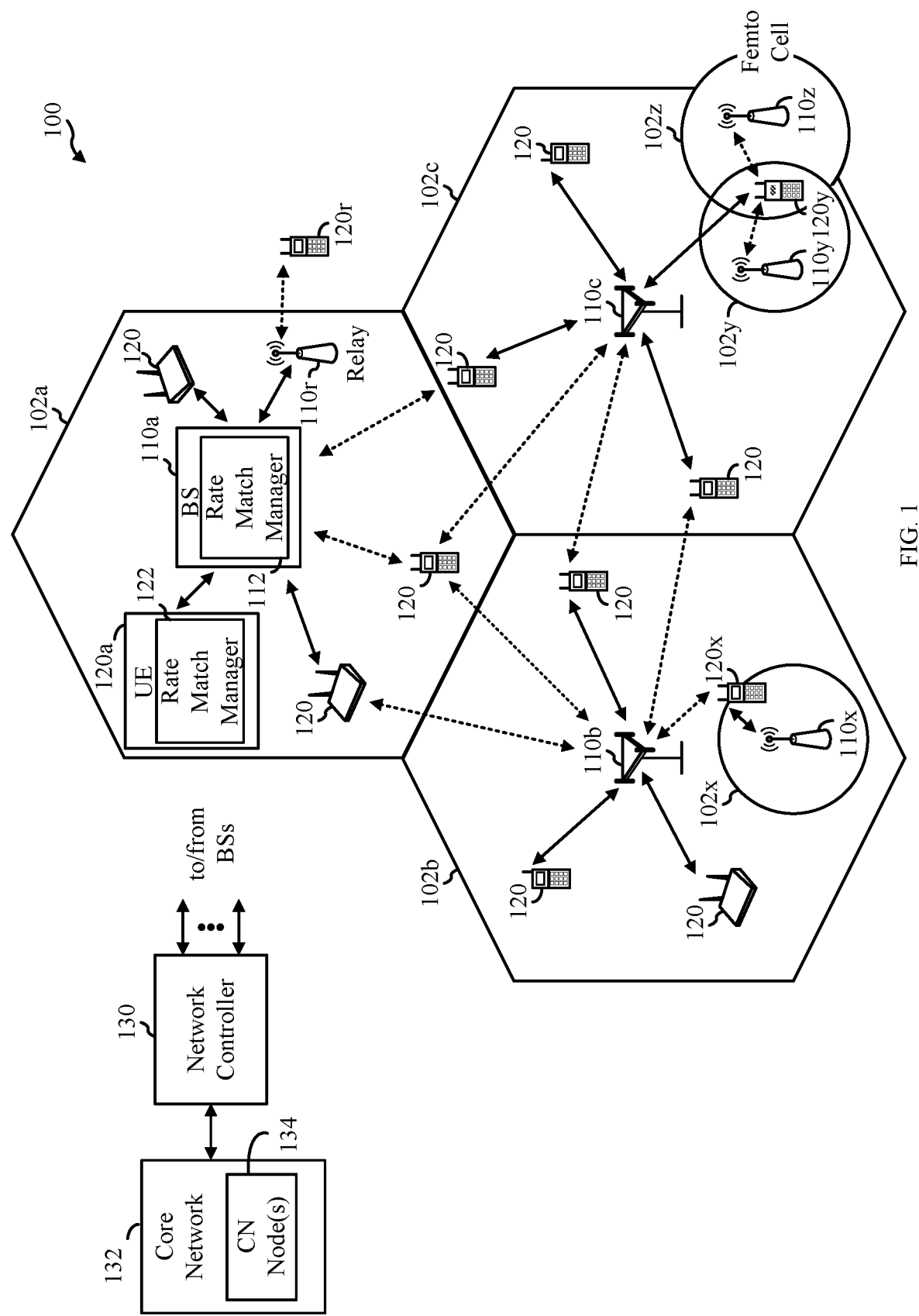
FIG. 1 is a block diagram conceptually illustrating an example telecommunications system, in accordance with certain aspects of the present disclosure.

In non-terrestrial networks (NTNs), there may be downsides related to the use of multiple beams using the same frequency or set of frequencies for transmission of their corresponding synchronization signal blocks (SSBs). For example, a user equipment (UE) and/or a network entity (e.g., base station (BS or satellite) may transmit and/or receive using only one bandwidth part (BWP) at one time. Thus, when the UE is tuned into a BWP assigned to a particular beam, and when the SSB frequency or set of frequencies is not within the BWP of the beam, the UE may need to switch to the SSB frequency or set of frequencies in order to receive the SSB for the beam. In an aspect, when an antenna or antenna array of a transmission entity (e.g., BS or satellite) switches away from a data BWP assigned to a particular beam to transmit an SSB for the beam, the antenna or antenna array may not be able to transmit data on the data BWP during the SSB transmission. Additionally, if a first beam is used to transmit an SSB using a set of frequencies included in a BWP assigned to a neighboring second beam, the SSB transmission for the first beam may cause interference to the second beam.

Aspects of the present disclosure provide beam-specific rate matching techniques for rate matching data transmissions around resources (e.g., time and/or frequency resources) used for SSB transmissions in NTN, in order to address the implications of sequential SSB transmissions across beams on a common frequency or set of frequencies.

The following description provides examples of rate matching in wireless communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G new radio (NR)) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more BSs 110 and/or UEs 120 in the wireless communication network 100 via one or more interfaces.

As illustrated in FIG. 1, the wireless communication network 100 may include a number of BSs 110*a-z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. A network controller 130 may couple to a set of BSs 110 and provide coordination and control for these BSs 110 (e.g., via a backhaul).

The BSs 110 communicate with UEs 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile. Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for rate matching in NTNs. As shown in FIG. 1, the BS 110*a* includes a rate match manager 112. The rate match manager 112 may be configured to determine a beam-specific rate matching pattern for at least one beam of a plurality of beams configured for the UE, wherein a SSB transmission corresponding to each of the plurality of beams is configured using the same set of frequencies, transmit configuration information indicating the beam-specific rate matching pattern, and transmit a data channel using the at least one beam based on the rate matching pattern, in accordance with aspects of the present disclosure. As shown in FIG. 1, the UE 120*a* includes a rate match manager 122. The rate match manager 122 may be configured to receive configuration information indicating a beam-specific rate matching pattern for at least one beam of a plurality of beams configured for the UE, wherein a SSB transmission corresponding to each of the plurality of beams is configured using the same set of frequencies, receive a data channel using the at least one beam, and process the data channel based on the rate matching pattern, in accordance with aspects of the present disclosure.

Figure 2:
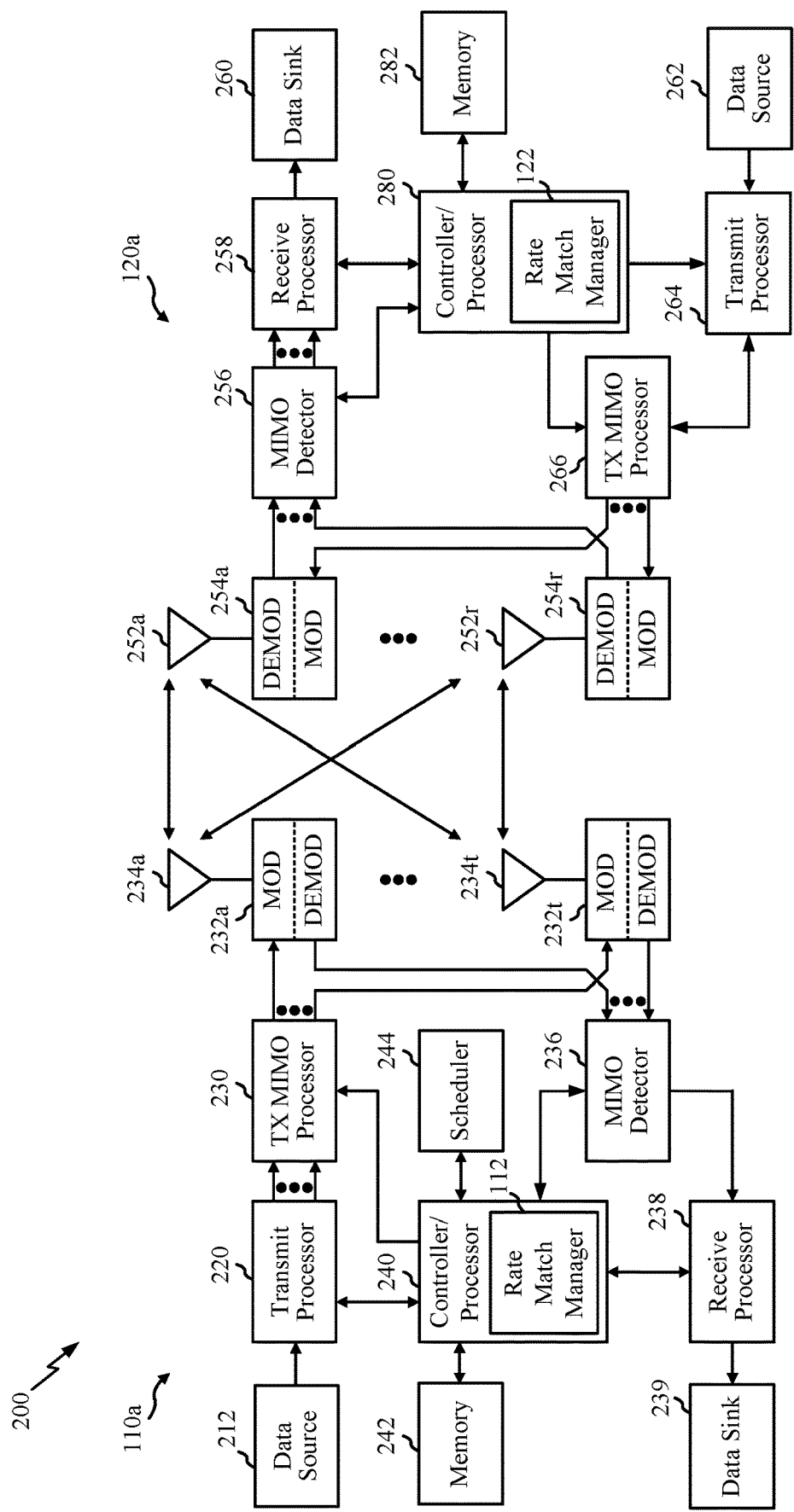
FIG. 2 is a block diagram conceptually illustrating a design of an example base station (BS) and user equipment (UE), in accordance with certain aspects of the present disclosure.

FIG. 2 is a block diagram conceptually illustrating a design of an example BS and UE (e.g., BS 110*a* and UE 120*a* in the wireless communication network 100 of FIG. 1), in accordance with certain aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC) control element (MACCE) is a MAC layer communication structure that may be used for control command exchange between wireless nodes. The MACCE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink (UL), at UE 120a, a transmit processor 264 may receive and process data (e.g., for the PUSCH) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for single-carrier frequency division (SC-FDM), etc.), and transmitted to the BS 110a. At the BS 110a, the UL signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a rate match manager 112 that may be configured to determine a beam-specific rate matching pattern for at least one beam of a plurality of beams configured for the UE, wherein a SSB transmission corresponding to each of the plurality of beams is configured using the same set of frequencies, transmit configuration information indicating the beam-specific rate matching pattern, and transmit a data channel using the at least one beam based on the rate matching pattern, according to aspects described herein. As shown in FIG. 2, the controller/processor 280 of the UE 120a has a rate match manager 122 that may be configured to receive configuration information indicating a beam-specific rate matching pattern for at least one beam of a plurality of beams configured for the UE, wherein a SSB transmission corresponding to each of the plurality of beams is configured using the same set of frequencies, receive a data channel using the at least one beam. and process the data channel based on the rate matching pattern, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
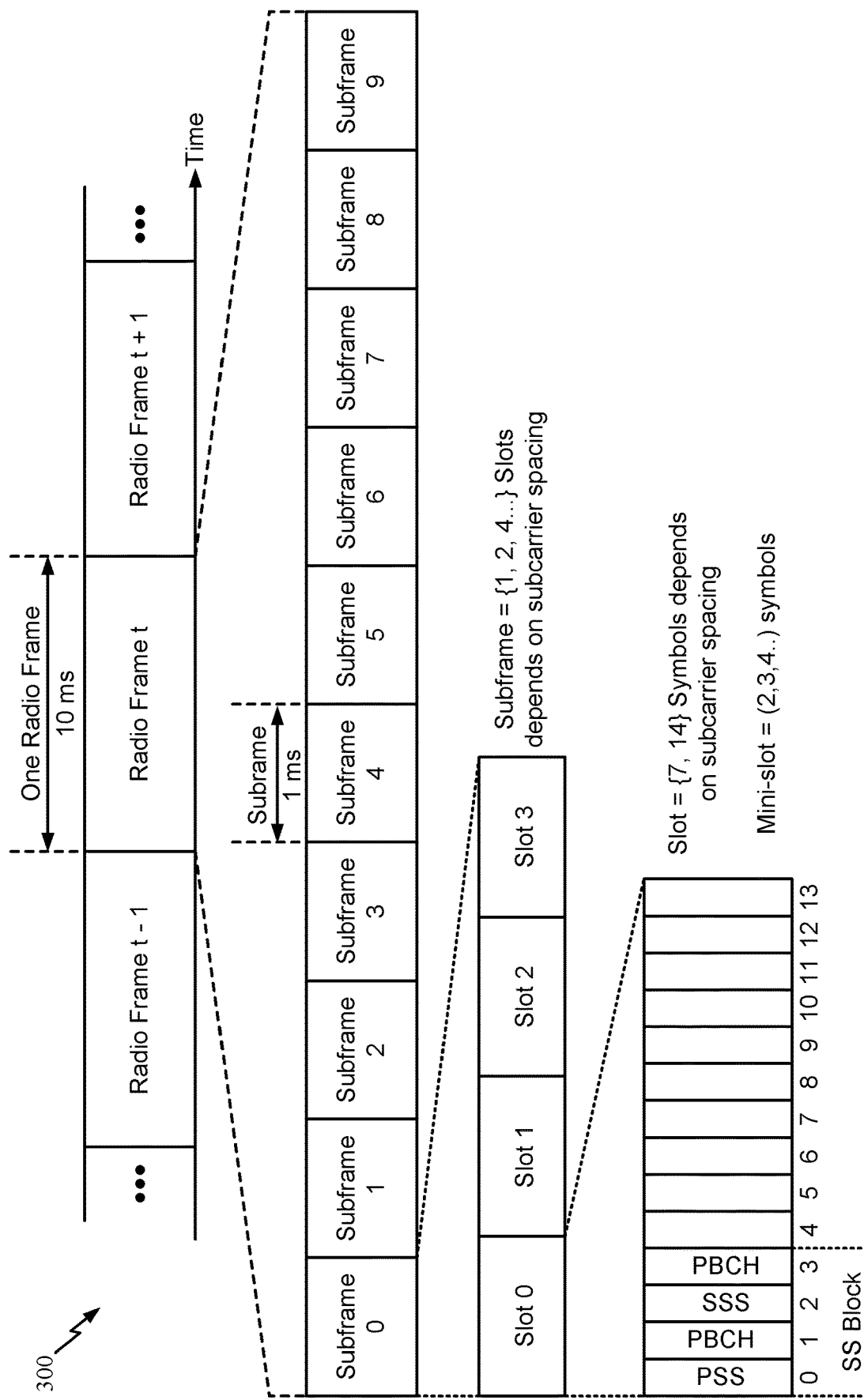
FIG. 3 is an example frame format for new radio (NR), in accordance with certain aspects of the present disclosure.

FIG. 3 is a diagram showing an example of a frame format 300 for NR. The transmission timeline for each of the downlink (DL) and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Example Rate Matching for Synchronization Signal Block (SSB) Transmissions in Non-Terrestrial Networks (NTNs)

Non-terrestrial networks (NTNs) refer to networks, or segments of networks, using an airborne or spaceborne vehicle for transmission. Airborne vehicles refer to High Altitude Platforms (HAPs) encompassing Unmanned Aircraft Systems (UAS) including tethered UAS, Lighter than Air UAS and Heavier than Air UAS, all operating at altitude generally between 8 and 50 km, quasi-stationary. These NTNs feature in technical specification group (TSG) radio access network's (RAN's) technical report (TR) 38.811 "Study on NR to support non-terrestrial networks". NTNs are expected to help foster the 5G service roll out in un-served or underserved areas to upgrade the performance of terrestrial networks, reinforce service reliability by providing service continuity for user equipments (UEs) or for moving platforms (e.g. passenger vehicles-aircraft, ships, high speed trains, buses), increase service availability everywhere especially for critical communications, future railway/maritime/aeronautical communications, and enable 5G network scalability through the provision of efficient multicast/broadcast resources for data delivery towards the network edges or even directly to the UE.

Generally in NTN, a satellite may be configured as a single cell with N beams and M bandwidth parts (BWPs). Each antenna or antenna array on the satellite forms a fixed beam, and switching between intra-satellite beams is usually the same as BWP switching, thus avoiding cell handover overhead. SSBs of different beams may be transmitted at a same frequency range (e.g., using a same set of one or more frequencies) for faster initial search by a UE. Additionally, frequency reuse may be adopted among beams for higher spectral efficiency. For example, multiple beams may be assigned the same BWP.

In certain aspects, there may be downsides related to the use of multiple beams using the same frequency or set of frequencies for transmission of their corresponding SSBs. For example, a UE and/or a network entity (e.g., base station (BS) or satellite) may transmit and/or receive using only one BWP at one time. Thus, when the UE is tuned into a BWP assigned to a particular beam and when the SSB frequency or set of frequencies is not within the BWP of the beam, the UE may need to switch to the SSB frequency or set of frequencies in order to receive the SSB for the beam. In an aspect, when an antenna or antenna array of a network entity (e.g., BS or satellite, or network) switches away from a data BWP assigned to a particular beam to transmit an SSB for the beam, the antenna or antenna array may not be able to transmit data on the data BWP during the SSB transmission. Additionally, if a first beam is used to transmit an SSB using a set of frequencies included in a BWP assigned to a neighboring second beam, the SSB transmission for the first beam may cause interference to the second beam.

For the purposes of the following discussion, an SSB frequency of a beam refers to a set of frequencies (e.g., may be a single frequency) that is used for SSB transmission for the beam. A data BWP of a beam refers to a BWP assigned to the beam and is used for downlink (DL) data transmissions for the beam.

Figure 4A:
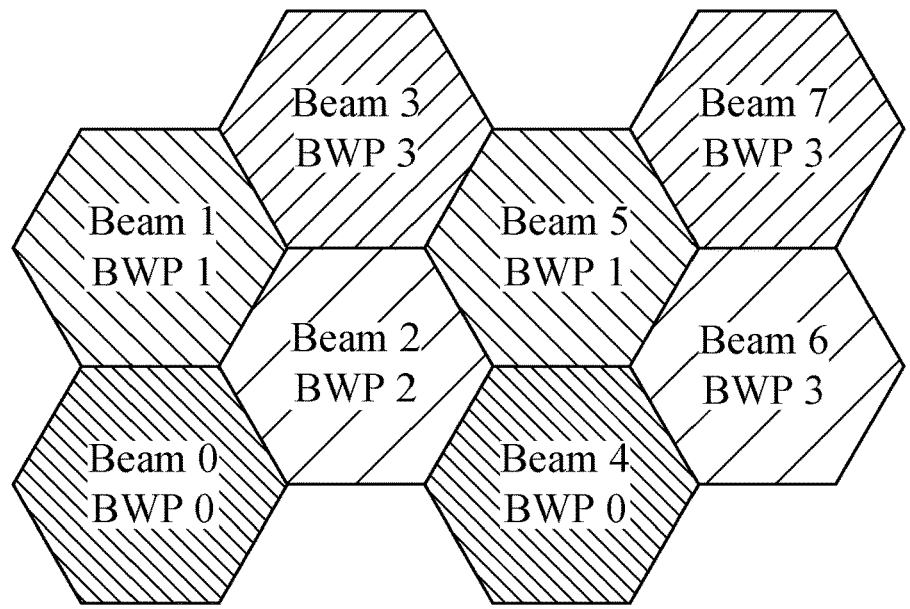
FIG. 4A conceptually illustrates example beam footprints of a satellite, in accordance with certain aspects of the present disclosure.

FIG. 4A conceptually illustrates example beam footprints of a satellite, in accordance with certain aspects of the present disclosure. FIG. 4A conceptually illustrates eight beam footprints (shown as beams 0-7) which may be seen by a UE on the surface of the Earth. A satellite (not shown) may transmit on any of the beams 0-7. As shown, each beam may be assigned a BWP (e.g., data BWP) which may be used for DL data transmissions for the beam. Four BWPs (shown as BWPs 0-3) may be shared between the eight beams with each BWP assigned to two different beams. As shown, BWP0 may be assigned to beams 0 and 4, BWP1 may be assigned to beams 1 and 5, BWP2 may be assigned to beams 2 and 6, and BWP3 may be assigned to beams 3 and 7.

The particular assignment of BWPs shown in FIG. 4A is for exemplary purposes only, and the BWP may be assigned and shared in any other manner. For example, a particular BWP may be assigned to any one or more beams.

Figure 4B:
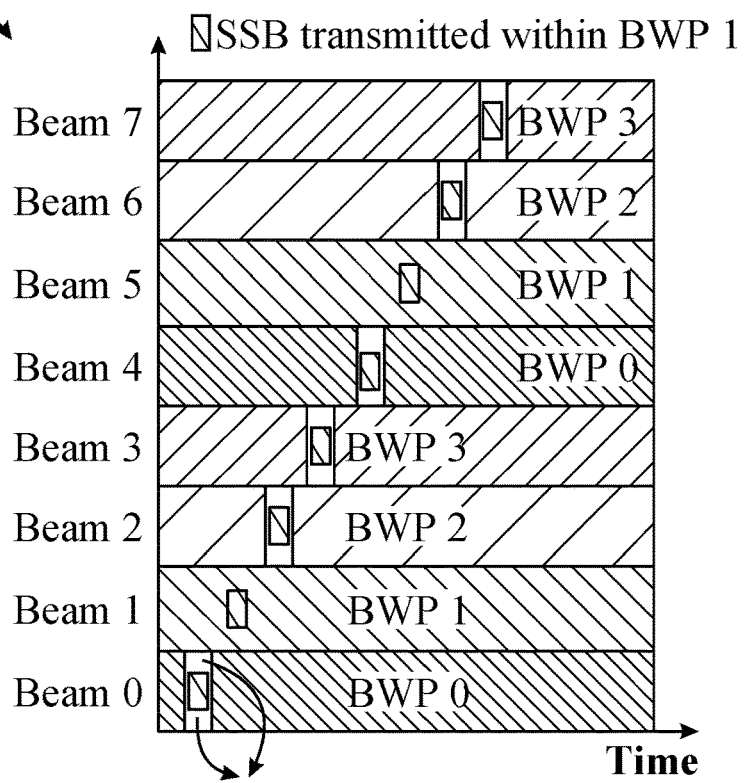
FIG. 4B conceptually illustrates example SSB transmissions for the beams shown in FIG. 4A, in accordance with certain aspects of the present disclosure.

FIG. 4B conceptually illustrates example SSB transmissions for the beams shown in FIG. 4A, in accordance with certain aspects of the present disclosure. As noted above, in NTN, SSBs corresponding to multiple beams supported by a satellite may be transmitted on a common SSB frequency or set of frequencies, for example, in order to facilitate fast initial search by UEs. Thus, it may be assumed that SSBs corresponding to beams 0-7 (e.g., all beams) may be transmitted using a common SSB frequency or set of frequencies. For the example of FIG. 4B, it may be assumed that the common SSB frequency is contained within BWP 1. However, the example illustrated in FIG. 4B is for exemplary purposes only, and the common SSB frequency may be contained within any one of the BWPs 0-3.

The y-axis shown in FIG. 4B may show SSB transmissions for each of the beams 0-7 over time (rather than represent frequencies). Thus, FIG. 4B may show time locations of SSB transmissions corresponding to beams 0-7. Further, while each SSB transmission corresponding to particular beam is shown within the BWP assigned to the corresponding beam (e.g., BWP0 is assigned to both beams 0 and 4), all SSB transmissions for all beams may actually be transmitted using the common SSB frequency contained within BWP1.

As noted above, a satellite beam may be capable of transmitting on only one BWP at one time. This means the satellite beam may not be capable of transmitting multiple BWPs simultaneously; however, the satellite may be capable of transmitting multiple BWPs in different beams simultaneously. Thus, even when SSB for a particular beam is transmitted on a set of frequencies not contained within the data BWP of the beam, the satellite may not transmit data on the unused resources of the data BWP during the SSB transmission. For example, as shown in FIG. 4B, while the SSB for beam 0 (SSB0) is transmitted within BWP1, the unused resources (e.g., white space surrounding the SSB) of BWP 0 during the SSB transmission may not be used for DL data transmission on beam 0.

In certain aspects, while FIG. 4A conceptually illustrates the beam footprints of the beams not overlapping each other, realistically, the beam footprints may overlap, and a UE may see multiple beams at any location on the Earth's surface.

Figure 5A:
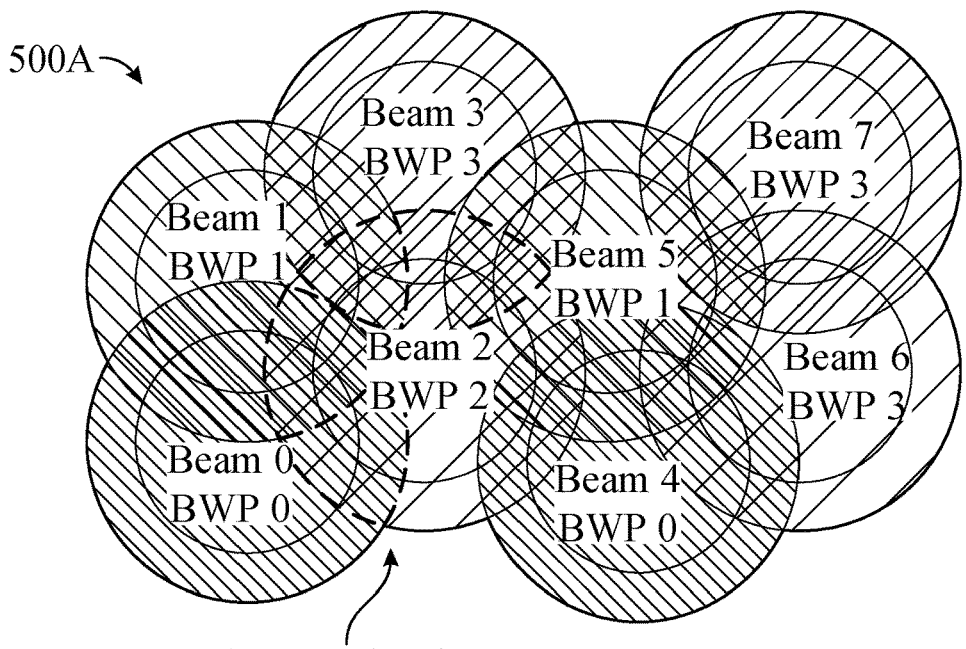
FIG. 5A illustrates example overlapping beam footprints of the satellite of beams shown in FIGS. 4A and 4B, in accordance with certain aspects of the present disclosure.
Figure 5B:
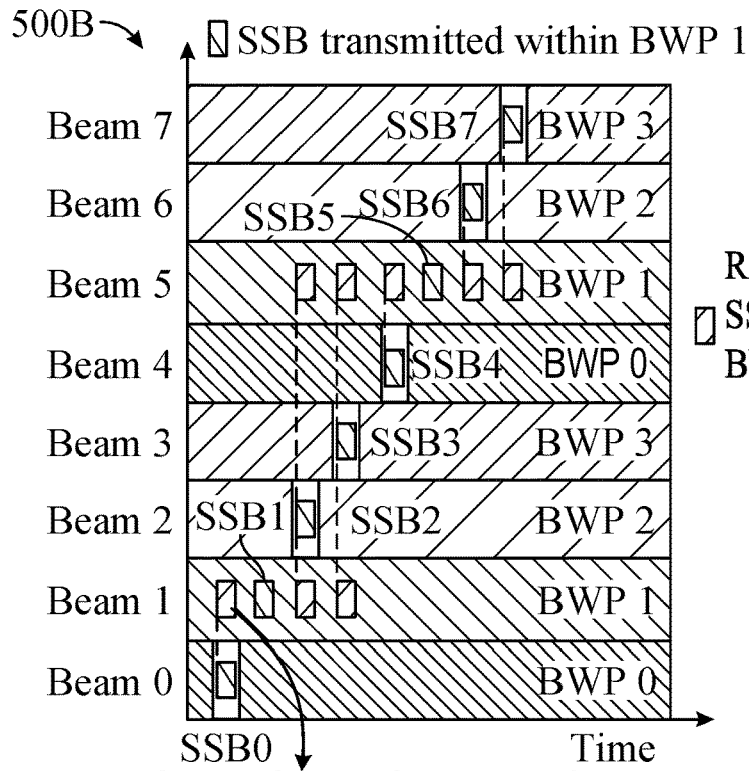
FIG. 5B illustrates example SSB transmissions for the beams shown in FIG. 5A, in accordance with certain aspects of the present disclosure.

FIG. 5A illustrates example overlapping beam footprints of the satellite of beams shown in FIGS. 4A and 4B, in accordance with certain aspects of the present disclosure. FIG. 5B illustrates example SSB transmissions for the beams shown in FIG. 5A, in accordance with certain aspects of the present disclosure.

In an aspect, because multiple beams may have overlapping beam footprints, a transmission on a particular beam may interfere with transmissions on neighboring beams with overlapping beam footprints. For example, as shown in FIG. 5A, beam 1 may have overlapping beam footprints with beam 0, beam 2 and beam 3. Thus, a transmission on any of the neighboring beams 0, 2 and 3 using BWP1 assigned to beam 1 may most likely interfere with data transmissions on beam 1 using BWP1. This is shown in FIG. 5B. As shown in FIG. 5B, SSB transmissions of beams 0, 2 and 3 using the common SSB frequency contained in BWP1 interferes with data transmissions on beam 1 using BWP1. Similarly, the beam footprint of beam 5 overlaps with beam footprints of beams 2, 3, 4, 6 and 7. Thus, as shown in FIG. 5B, SSB transmissions of beams 2, 3, 4, 6 and 7 using the common SSB frequency contained in BWP1 interferes with data transmissions on beam 5 using BWP1. In an aspect, as shown in FIG. 5B, each SSB transmission may be identified by an SSB index. For example, SSB transmission for beam 0 may be identified by SSB 0, SSB transmission for beam 1 may be identified by SSB 1, and so on.

Aspects of the present disclosure provide beam-specific rate matching techniques for rate matching data transmissions around resources (e.g., time and/or frequency resources) used for SSB transmissions in NTN, in order to address the implications of sequential SSB transmissions across beams on a common frequency or set of frequencies. The techniques discussed herein include techniques for rate matching data transmissions around SSB resources that either may not be used for data transmissions (e.g., as a result of antenna tune away) or may be interfered by SSB transmissions of a neighboring beam.

Figure 6:
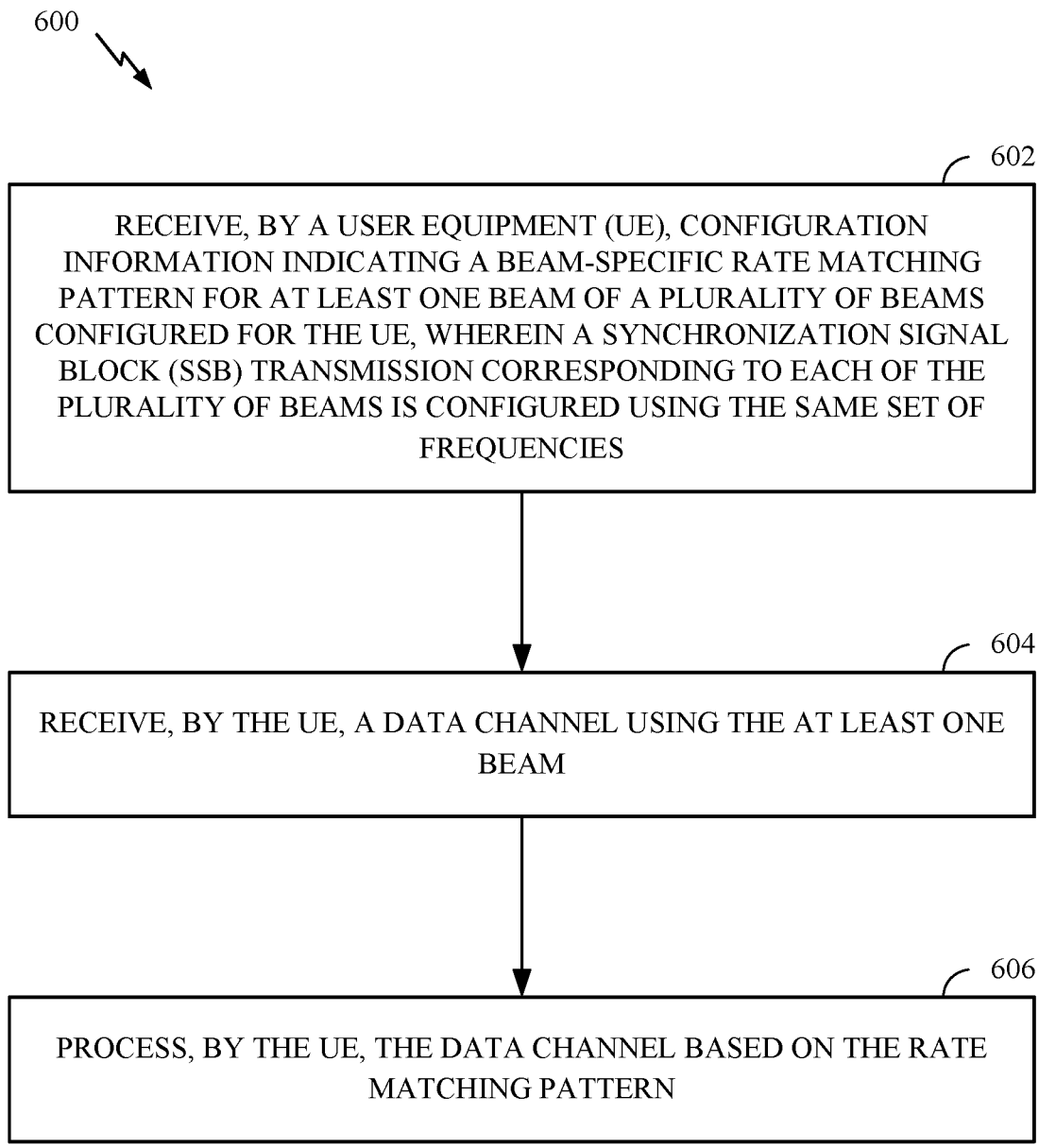
FIG. 6 is a flow diagram illustrating example operations for wireless communications by a UE, in accordance with certain aspects of the present disclosure.

FIG. 6 is a flow diagram illustrating example operations 600 for wireless communications by a UE, in accordance with certain aspects of the present disclosure.

Operations 600 begin, at 602, by a UE receiving configuration information indicating a beam-specific rate matching pattern for at least one beam of a plurality of beams configured for the UE, wherein a SSB transmission corresponding to each of the plurality of beams is configured using the same set of frequencies.

At 604, the UE receives a data channel (e.g., PDSCH) using the at least one beam.

At 606, the UE processes the data channel based on the rate matching pattern.

Figure 7:
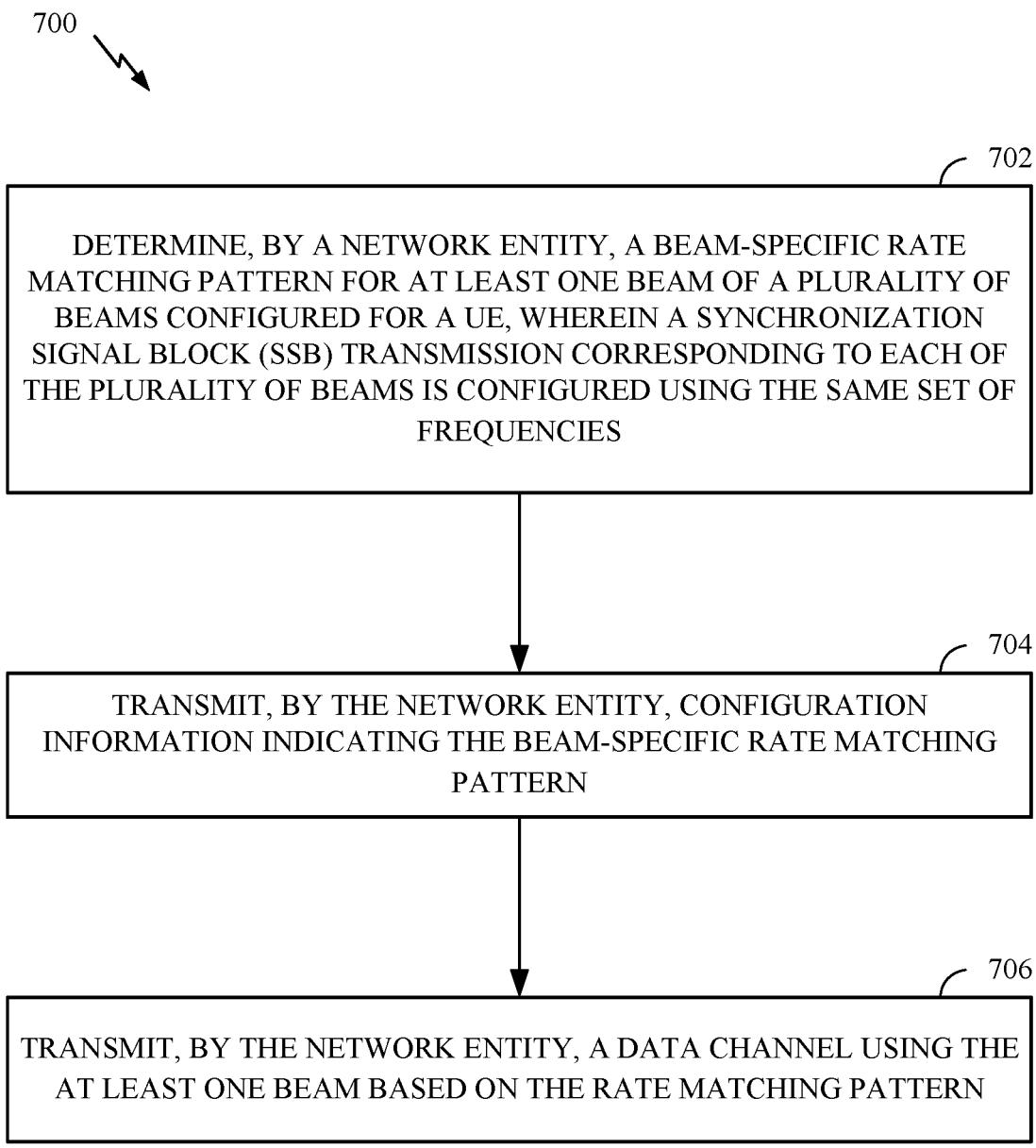
FIG. 7 is a flow diagram illustrating example operations for wireless communications by a network entity, in accordance with certain aspects of the present disclosure.

FIG. 7 is a flow diagram illustrating example operations 700 for wireless communications by a network entity (e.g., a BS or a satellite), in accordance with certain aspects of the present disclosure.

Operations 700 begin, at 702, by a network entity determining a beam-specific rate matching pattern for at least one beam of a plurality of beams configured for the UE, wherein a synchronization signal block (SSB) transmission corresponding to each of the plurality of beams is configured using the same set of frequencies.

At 704, the network entity transmits configuration information indicating the beam-specific rate matching pattern.

At 706, the network entity transmits a data channel is transmitted using the at least one beam based on the rate matching pattern.

In certain aspects, a beam-specific rate matching pattern may define one or more rate match regions for the beam. Data transmission on the data channel (e.g., PDSCH transmission) on the beam may be rate matched around the defined rate match regions for the beam. In an aspect, each rate match region defined for a beam may include time resources (e.g., symbols) and/or frequency resources (e.g., frequencies in a data BWP). The data transmission may be rate matched around the time and/or frequency resources of a defined rate match region.

In certain aspects, each rate match region of a beam may correspond to a SSB transmission of a particular beam (including the beam's own SSB transmission) and depend on whether the SSB frequency of the SSB transmission is contained (e.g., at least partially contained) within the data BWP of the particular beam.

As noted above, SSB transmissions of multiple beams may use a common SSB frequency. In an aspect, assuming a common SSB frequency is being used across beams, a beam-specific rate matching pattern for a beam may define three different types of rate match regions. A first type may include a rate match region corresponding to a SSB transmission of the beam when the SSB frequency is not contained within the data BWP of the beam. A second type may include a rate match region corresponding to an SSB transmission of the beam when the SSB frequency is contained within the data BWP of the beam. A third type may include a rate match region corresponding to an SSB transmission of a neighboring beam (with overlapping beam footprints) when the SSB frequency is contained within the data BWP of the beam.

Figure 8:
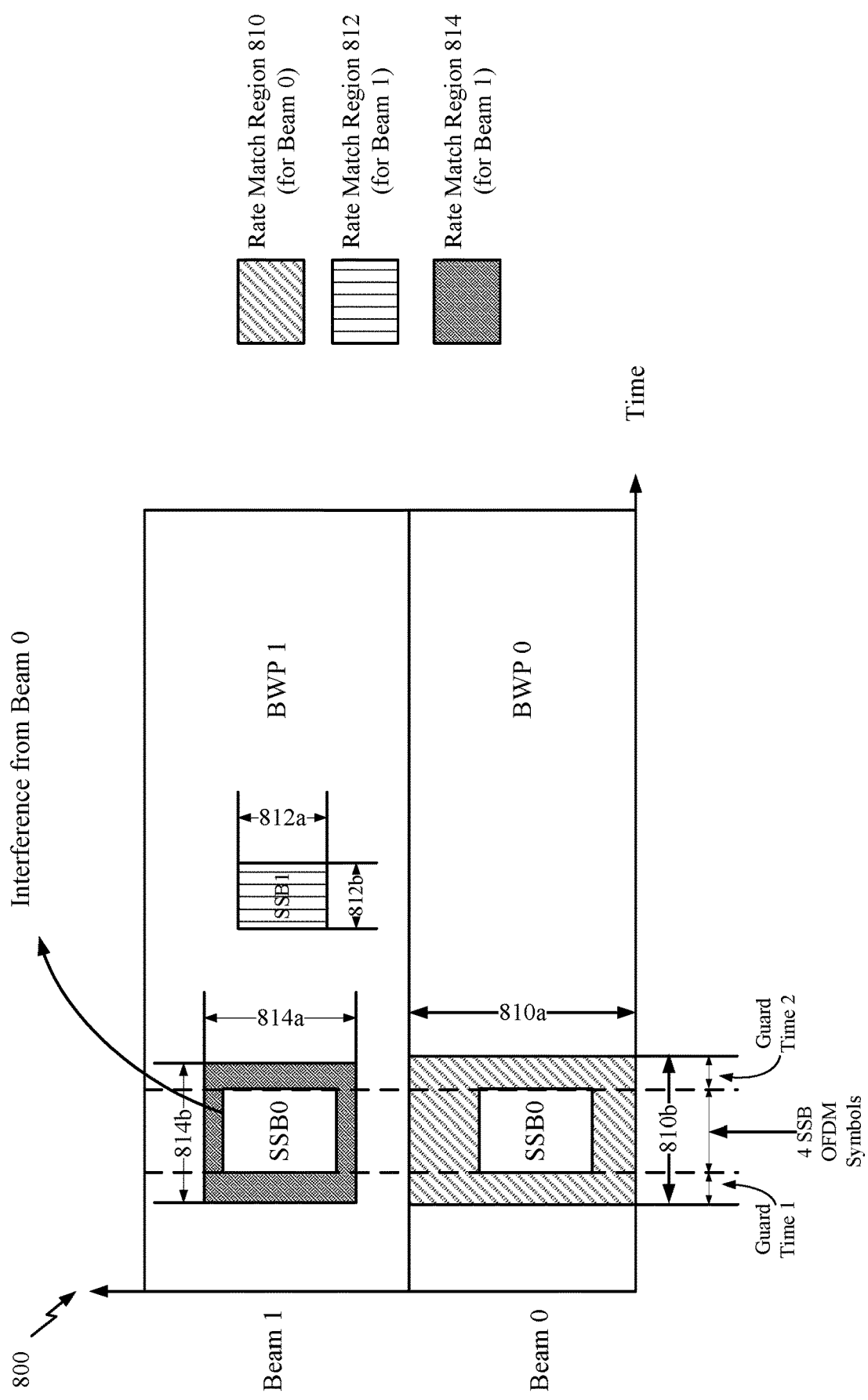
FIG. 8 illustrates example rate match regions corresponding to SSB transmissions of beams 0 and 1 of FIG. 5B, in accordance with certain aspects of the present disclosure.

FIG. 8 illustrates example rate match regions corresponding to SSB transmissions of beams 0 and 1 of FIG. 5B, in accordance with certain aspects of the present disclosure.

As shown in FIG. 8, the rate match region 810 for beam 0 may correspond to a SSB transmission of beam 0 (shown as SSB0). The rate match region 810 may be a first type of rate match region (e.g., a rate match region corresponding to a SSB transmission of the beam when the SSB frequency is not contained within the data BWP of the beam). As noted above with reference to FIG. 5B, the common SSB frequency (e.g., common SSB frequency across beams 0-7) may be contained within BWP1 assigned to beam 1. Thus, the SSB0 transmission of beam 0 may use the SSB frequency contained in BWP1 of beam 1. Since the SSB frequency for SSB0 transmission is not contained within BWP0 assigned to beam 0, the satellite may switch frequency to transmit SSB0. In such a case, as shown in FIG. 8, the rate match region 810 may include the entire BWP0 in the frequency domain (e.g., 810a extends the entire height of BWP0 shown in FIG. 8), for a duration 810b in the time domain. The duration 810b of the rate match region 810 may include SSB0 transmission (shown as 4 SSB orthogonal frequency-division multiplexing (OFDM) symbols), a first guard period (shown as Guard Time 1) and a second guard period (shown as Guard Time 2).

In an aspect, the duration 810b of the rate match region 810 may be defined as, ceiling(T/(one data OFDM symbol duration))×(one data OFDM symbol duration)

where T=(Guard time 1)+(4 SSB OFDM Symbols duration)+(Guard time2). The duration of the rate match region and the duration of T may be defined in terms of the data OFDM symbol duration; however, the two durations may not be equal, according to the equations above. The ceiling function may be necessary because T may not be an integer multiple of the data OFDM symbol duration.

In an aspect, Guard Time 1 may represent a time duration for frequency switching from data BWP 0 to the SSB frequency, and Guard Time 2 may represent a time duration for frequency switching from the SSB frequency back to BWP0. In an aspect, the Guard Times 1 and 2 may be determined based on the specified minimum UE requirements for switching between frequencies.

In an aspect, the use of SSB OFDM symbols and data OFDM symbols in the above expression may signify that the subcarrier spacing (SCS) may be different for SSB transmissions and data transmissions.

In certain aspects, the impact of phase continuity on channel estimation may need to be considered when rate matching around rate match region 810. For example, a receiving UE may need to estimate the channel again after the duration of the rate match region 810 (e.g., in some aspects as given by the above expression) has expired for use in further data receptions.

As shown in FIG. 8, the rate match region 812 for beam 1 may correspond to a SSB transmission of beam 1 (shown as SSB1). The rate match region 812 may be a second type of rate match region (e.g., a rate match region corresponding to an SSB transmission of the beam when the SSB frequency is contained within the data BWP of the beam). As shown in FIG. 8, the SSB1 transmission of beam 1 may use the SSB frequency contained within BWP1 of beam 1. The rate match region 812 may include a portion of BWP1 in the frequency domain used for the SSB1 transmission (e.g., 812a includes only frequency resources used for the SSB1 transmission), and the duration of the SSB1 transmission in the time domain (e.g., 812b includes only OFDM symbols used for the SSB1 transmission).

As shown in FIG. 8, the rate match region 814 for beam 1 may correspond to the SSB0 transmission of beam 0. Because the SSB frequency for the SSB0 transmission is contained within the BWP1 and the beam footprint of beam 0 overlaps with that of beam 1, data may not be transmitted on beam 1 during the transmit period of SSB0. In an aspect, the data transmission for beam 1 may be rate matched around resources (e.g., time and frequency resources) used for the SSB0 transmission.

As shown in FIG. 8, the rate match region 814 may include a portion of BWP1 in the frequency domain used for the SSB0 transmission, and the duration of the SSB0 transmission in the time domain. However, as shown the rate match region 814 may be larger than the time and frequency resources used for the SSB0 transmission. For example, as shown, the rate match region 814 may include additional frequencies below and above the SSB frequencies (e.g., 814a includes frequency resources used for the SSB0 transmission plus additional frequencies below and above the SSB frequencies) and additional time durations (e.g., additional OFDM symbols) before and after the SSB 0 transmission (e.g., 814b includes OFDM symbols used for the SSB0 transmission plus additional OFDM symbols before and after the SSB frequencies). In an aspect, the additional time and frequency resources account for loss of orthogonality resulting from different frequency compensations used for beam 0 and beam 1. The frequency compensation for UEs in the footprint of beam 0 and the frequency compensation for UEs in the footprint of beam 1 may be different due to different Doppler frequency shifts. Consequently, beam 0 may not be able to set a frequency compensation useful for UEs in the footprint of beam 0 for the SSB transmission while also ensuring that the same frequency compensation is useful for UEs (which perceive the SSB transmission as interference) in the footprint of beam 1.

In certain aspects, for a given beam, a network entity (e.g., a BS or satellite) may determine whether to rate match for each SSB transmission of a beam (including the beam's own SSB transmission), for example, based on whether the SSB frequency is within the beam's assigned BWP or the resources of the BWP are forbidden for data transmission during the SSB transmission (e.g., during antenna tune away, as described above). Subsequent to the network entity deciding that rate match may be done for the SSB transmission, the network entity may select a mode for the rate match. In an aspect, the selection of the mode of rate match may be a function of whether the SSB frequency is within the beam's assigned BWP or the resources of the BWP are forbidden for data transmission during the SSB transmission (e.g., during antenna tune away).

In a first mode of rate match, the network entity may rate match across the entire data BWP of the beam for the duration of the SSB transmission and guard times (e.g., Guard Time 1 and Guard Time 2 included in duration 810b of FIG. 8). In an aspect, the network entity may select the first mode of rate match corresponding to the SSB transmission when the time and frequency resources of the beam's BWP are forbidden for data transmission during the SSB transmission (e.g., during an antenna tune away).

In a second mode, the network entity may rate match around the time and frequency resources used for the SSB transmission. In an aspect, the network entity may select the rate match region corresponding to an SSB transmission when SSB frequency is within the beam's assigned BWP. In an aspect, the network entity may select a corresponding rate match region for the rate matching to be identical to the SSB transmission resource region (e.g., for the beam's own SSB transmission) (e.g., may select rate match region 812 of FIG. 8).

In a third mode, the network entity may rate match around the time and frequency resources used for the SSB transmission. In an aspect, the network entity may select the rate match region corresponding to an SSB transmission when SSB frequency is not within the beam's assigned BWP. In an aspect, the network entity may select a corresponding rate match region for the rate matching region as including the SSB transmission resource region and having additional time and frequency resources to allow for potential loss of orthogonality resulting from different frequency compensation values between neighboring beams (e.g., for a neighboring beam's SSB transmission) (e.g., may select rate match region 814 of FIG. 8).

In certain aspects the network entity may configure a UE with beam-specific rate matching patterns for beam-specific rate matching on a data channel (e.g., PDSCH) during sequential SSB transmissions across beams on a common SSB frequency.

In certain aspects, the network entity may configure the SSB rate match behavior using system information (e.g., using system information block (SIB)).

In an aspect, the network entity may transmit a common SIB message for all N beams of a satellite. The SIB message may include N rate matching configurations (one rate match configuration for each of the N beams), wherein each configuration of the N rate matching configurations defines one beam-specific rate matching pattern for a beam defining one or rate match regions for the beam. Assuming there is one SSB transmission for each of the N beams, each beam may be identified by a corresponding SSB index. Each of the N beam-specific rate match configurations may include a rate match information element (IE) (e.g., an SSB-rate-match IE) for each of the N SSB transmissions of the N beams, wherein the SSB-rate-match IEs may take one of three different values. In one example, a value of '0' may define no rate matching, a value of '1' may define a rate match mode 1 including rate matching across the entire BWP for the duration of the SSB transmission and Guard Times 1 and 2 (e.g., rate match region 810 as shown in FIG. 8), a value of '2' may define a rate match mode 2 including a rate match region containing the SSB transmission resources and additional time and frequency resources (e.g., rate match region 814 as shown in FIG. 8), and a value of '3' may define a rate match mode 3 including a rate match region that is identical to the SSB transmission resource region (e.g., rate match region 812 as shown in FIG. 8).

In an aspect, the network entity may additionally transmit (e.g., in the SIB) a phase continuity indicator (e.g., Phase-Continuity IE) for the rate match mode 1. A value of '0' of the phase continuity indicator may indicate that phase continuity does not hold, and the UE may need to re-estimate the channel. In an aspect, the network entity may configure additional demodulation reference signals (DMRSs) for use in channel estimation when a beam switches back from the SSB frequency to the data BWP of the beam. A value of '1' of the phase continuity indicator may indicate that phase contiguity holds and the UE does not need to re-estimate the channel after the switch back to the data BWP. In an aspect, the phase continuity indicator may be signaled separately from the rate matching configuration or jointly.

Table-1 illustrates example rate matching configurations for N=7 beams as included in an SIB message, in accordance with certain aspects of the present disclosure.

TABLE-1

| BEAMS | SSB0 | SSB1 | SSB2 | SSB3 | SSB4 | SSB5 | SSB6 | SSB7 |
|---|---|---|---|---|---|---|---|---|
| 0 | 1 | 0 | 0 | 0 | 0 | 0 | 0 | 0 |
| 1 | 2 | 3 | 2 | 2 | 0 | 0 | 0 | 0 |
| 2 | 0 | 0 | 1 | 0 | 0 | 0 | 0 | 0 |
| 3 | 0 | 0 | 0 | 1 | 0 | 0 | 0 | 0 |
| 4 | 0 | 0 | 0 | 0 | 1 | 0 | 0 | 0 |
| 5 | 0 | 0 | 2 | 2 | 2 | 3 | 2 | 2 |
| 6 | 0 | 0 | 0 | 0 | 0 | 0 | 1 | 0 |
| 7 | 0 | 0 | 0 | 0 | 0 | 0 | 0 | 1 |

In certain aspects, the SSB-rate-match and PhaseContinuity IEs may be jointly encoded.

In an aspect, a beam-specific SIB message may be transmitted. The SIB message may include the rate matching configuration associated with only the one beam. In this case, the rate matching configuration for the beam may be similar to one of the N rate matching configurations described above.

In an aspect, the UE may use the rate matching configuration received in the SIB and SSB burst information in order to derive the rate match regions for each beam. In certain aspects, the network entity may configure the beam-specific rate matching patterns using the IE RateMatchPattern as defined in the 3GPP standards (e.g., 3GPP TS 38.331). The RateMatchPattern IE may be used to configure one rate matching pattern for PDSCH. In an aspect, for each beam identified by an SSB index, a pair of bitmaps (e.g., bitmaps IE of the RateMatchPattern IE) may be used to specify the rate match regions. The bitmaps IE may indicate rate matching patterns by a pair of bitmaps resourceBlocks IE and symbolsInResourceBlock IE to define the rate match pattern within one or two slots. The resourceBlocks IE may be a resource block (RB) level bitmap in the frequency domain and may specify frequencies of a rate match region at a granularity of RBs. The symbolsInResourceBlock IE may be a symbol level bitmap in the time domain and may specify the symbols of a rate match region.

In an aspect, the network may additionally transmit a phase continuity indicator (e.g., PhaseContinuity IE) for the rate match mode 1. A value of '0' of the phase continuity indicator may indicate that phase continuity does not hold, and the UE may need to re-estimate the channel. A value of '1' of the phase continuity indicator may indicate that phase continuity holds, and the UE does not need to re-estimate the channel after the switch back to the data BWP.

In certain aspects, additionally or alternatively, for each beam identified by a SSB index, a control resource set (CORESET) may be defined using a controlResourceSet IE of the RateMatchPattern IE, and the UE may rate match around the configured CORESET. IE, controlResourceSet IE, of the RateMatchPattern IE may define a CORESET used as a PDSCH rate matching pattern (i.e., PDSCH reception may rate match around it). In frequency domain, the resource may be determined by the frequency domain resource of the CORESET with the corresponding CORESET ID. The time domain resource may be determined by the parameters of the associated search space of the CORESET.

In an aspect, a CORESET may be defined (e.g., defining the beam specific rate matching pattern), and an identifier (ID) of the defined CORESET may be passed as controlResourceSet IE to the RateMatchPattern IE. The UE may rate match around the defined CORESET.

In an aspect, a frequencyDomainResources IE of the controlResourceSet IE may specify the CORESET resources in frequency domain while a duration IE of the controlResourceSet IE may specify the CORESET resources in time domain. In an aspect, the duration IE may specify a contiguous time duration of the CORESET in number of symbols. In an aspect, an associated SearchSpace IE may be used to specify the time domain locations of the symbols to be rate matched around. The IE SearchSpace may define how/where to search for PDCCH candidates. Each search space may be associated with one ControlResourceSet.

In an aspect, the network entity may additionally transmit a phase continuity indicator (e.g., PhaseContinuity IE) for the rate match mode 1, as described above.

In certain aspects, the network entity may define a block rate match pattern to specify the rate match regions for SSB transmissions in NTN. In an aspect, the block rate pattern may be beam-specific. The network entity may convey to the UE various parameters that define a block rate match pattern. The parameters may include one or more of an offset, a frequency interval, a time interval, and a periodicityAndPattern IE.

In certain aspects, the offset may specify a lower left corner of a rate match region (e.g., rate match regions 810, 812 and 814 as shown in FIG. 8). The offset may include an RB index and a symbol index to identify the time and frequency location of the lower left corner of the rate match region. The RB index may be an index of an RB that is closest to and outside the rate match region. The symbol index may be an index of an OFDM symbol that is closest to and outside the rate match region.

In certain aspects, the frequency interval may specify the width of the rate match region in the frequency domain as a number of RBs. In a first case, the frequency interval may be equal to the number of RBs in the active BWP when the PDSCH is rate matched across the entire BWP. In a second case, the frequency interval may be specified by, ceiling(20×(SSB subCarrierSpacing)/(data subCarrierSpacing))×(data subCarrierSpacing)

In an aspect, the first case may correspond to the case when SSB frequency of an active beam is not contained within the beam's active BWP. The second case may correspond to the case when the SSB frequency of the active beam is contained within the beam's active BWP.

In an aspect, the frequency interval may be indicated by one bit, wherein a '0' indicates a frequency interval according to the first case and '1' indicates a frequency interval according to the second case.

The time interval may specify a duration of the rate match region in the time domain as a number of OFDM symbols. In the first case described above, the time interval may be specified as, > ceiling(*T*/(one data OFDM symbol duration))×(one data OFDM symbol duration), where *T*=(guard time 1)+(4 SSB OFDM symbols duration)+ (guard time2)

In the second case described above, the time interval may be specified as,

> ceiling((4 SSB OFDM symbols duration)/(one data OFDM symbol duration))×(one data OFDM symbol duration)

The periodicityAndpattern IE may specify the repetition of the rate matching. In the first case described above, a periodicity period may be equal to the period of the SSB burst set. For the second case described above, a periodicity period may be equal to the period of the SSB burst set together with time instants corresponding to the interfering SSB transmissions from neighboring beams within the SSB burst set period.

In an aspect, the network entity may additionally transmit a phase continuity indicator (e.g., PhaseContinuity IE) for the rate match mode 1, as described above.

Figure 9:
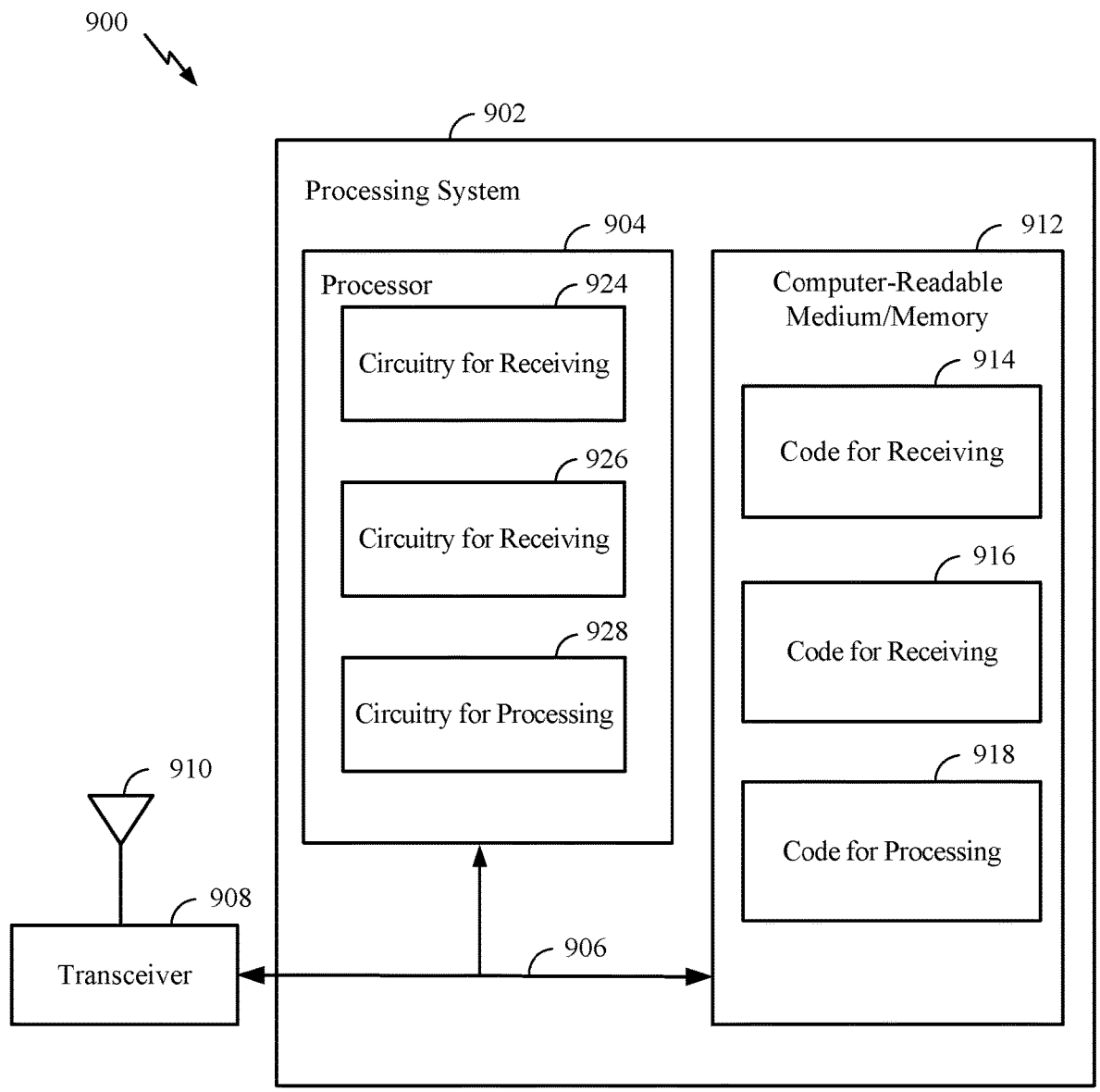
FIG. 9 illustrates a communications device that may include various components configured to perform operations for the techniques disclosed herein, in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 6. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 6, or other operations for performing the various techniques discussed herein. In certain aspects, computer-readable medium/memory 912 stores code 914 for receiving (e.g., for receiving configuration information indicating a beam-specific rate matching pattern for at least one beam of a plurality of beams configured for the UE, wherein a SSB transmission corresponding to each of the plurality of beams is configured using the same set of frequencies); code 916 for receiving (e.g., for receiving a data channel using the at least one beam); and code 918 for processing (e.g., for processing the data channel based on the rate matching pattern). In certain aspects, the processor 904 has circuitry configured to implement the code stored in the computer-readable medium/memory 912. The processor 904 includes circuitry 924 for receiving (e.g., for receiving configuration information indicating a beam-specific rate matching pattern for at least one beam of a plurality of beams configured for the UE, wherein a SSB transmission corresponding to each of the plurality of beams is configured using the same set of frequencies); circuitry 926 for receiving (e.g., for receiving a data channel using the at least one beam); and circuitry 928 for processing (e.g., for processing the data channel based on the rate matching pattern).

Figure 10:
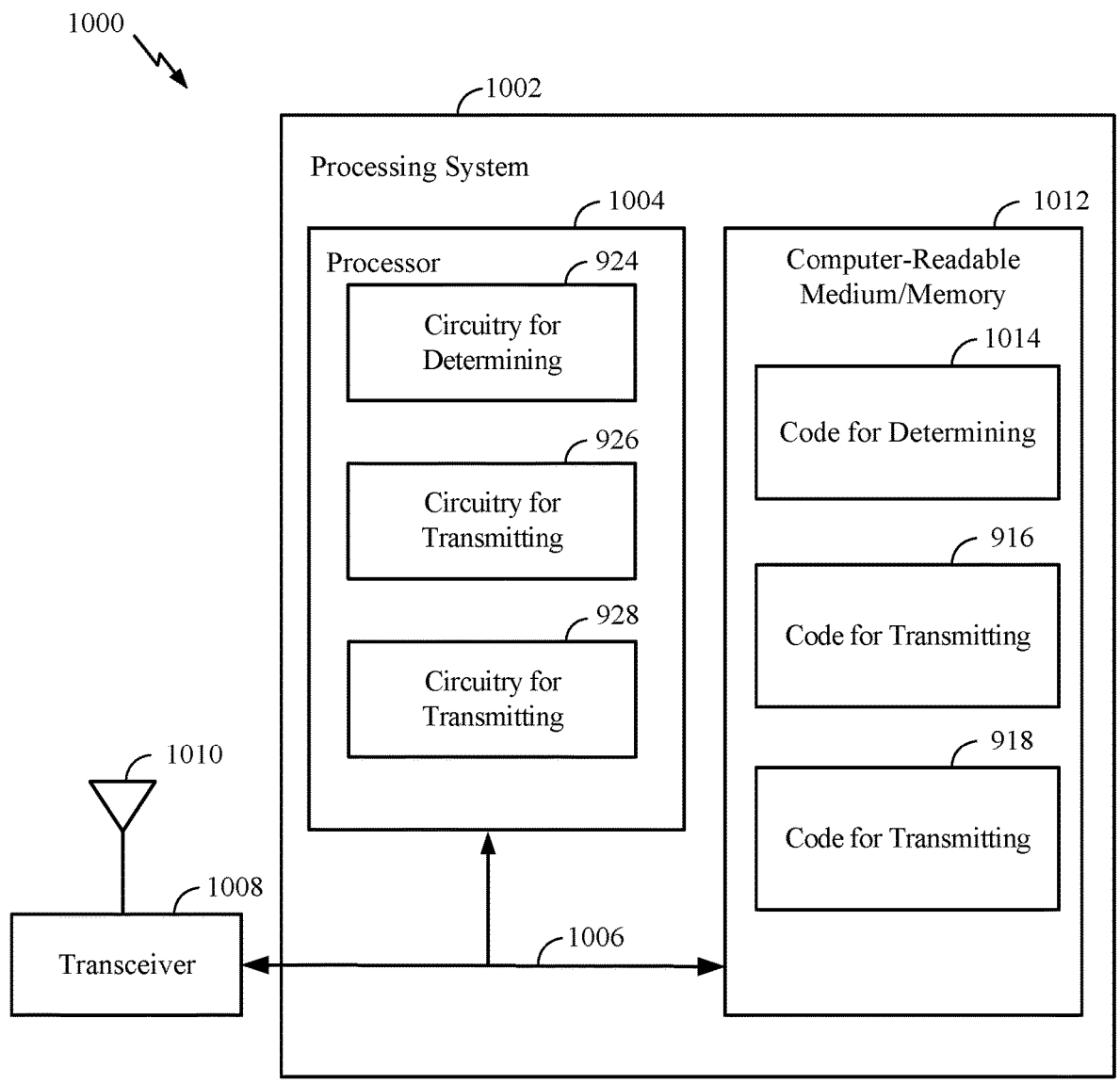
FIG. 10 illustrates a communications device that may include various components configured to perform operations for the techniques disclosed herein, in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 7. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 7, or other operations for performing the various techniques discussed herein. In certain aspects, computer-readable medium/memory 1012 stores code 1014 for determining (e.g., for determining a beam-specific rate matching pattern for at least one beam of a plurality of beams configured for the a UE, wherein a SSB transmission corresponding to each of the plurality of beams is configured using the same set of frequencies); code 1016 for transmitting (e.g., for transmitting configuration information indicating the beam-specific rate matching pattern); and code 1018 for transmitting (e.g., for transmitting a data channel using the at least one beam based on the rate matching pattern). In certain aspects, the processor 1004 has circuitry configured to implement the code stored in the computer-readable medium/memory 1012. The processor 1004 includes circuitry 1024 for determining (e.g., for determining a beam-specific rate matching pattern for at least one beam of a plurality of beams configured for the a UE, wherein a SSB transmission corresponding to each of the plurality of beams is configured using the same set of frequencies); circuitry 1026 for transmitting (e.g., for transmitting configuration information indicating the beam-specific rate matching pattern); and circuitry 1028 for transmitting (e.g., for transmitting a data channel using the at least one beam based on the rate matching pattern).

Example Aspects

Aspect 1: A method for wireless communication by a user equipment (UE), comprising: receiving configuration information indicating a beam-specific rate matching pattern for at least one beam of a plurality of beams configured for the UE, wherein a synchronization signal block (SSB) transmission corresponding to each of the plurality of beams is configured using the same set of frequencies; receiving a data channel using the at least one beam; and processing the data channel based on the rate matching pattern.

Aspect 2: The method of Aspect 1, wherein the rate matching pattern defines at least one of: a first rate match region corresponding to a first SSB transmission for the at least one beam when the set of frequencies is not contained within frequency resources assigned for receiving the data channel on the at least one beam; a second rate match region corresponding to the first SSB transmission for the at least one beam when the set of frequencies is contained within the frequency resources assigned for receiving the data channel of the at least one beam; or a third rate match region corresponding to a second SSB transmission for a neighboring beam of the plurality of beams when the set of frequencies is contained within the frequency resources assigned for receiving the data channel of the at least one beam, wherein the data channel is rate matched around at least one of the first, second or third rate match regions.

Aspect 3: The method of Aspect 2, wherein the first rate match region comprises: an entire bandwidth part (BWP) assigned to the at least one beam in a frequency domain; and a duration of the first SSB transmission, a first guard period and a second guard period, in a time domain.

Aspect 4: The method of Aspect 3, wherein the first guard period comprises a time taken by the UE to switch from the BWP of the at least one beam to the set of frequencies for receiving the first SSB transmission.

Aspect 5: The method of Aspect 3 or 4, wherein the second guard period comprises a time taken by the UE to switch back from the set of frequencies to the BWP of the at least one beam.

Aspect 6: The method of any of Aspects 2-5, wherein the second rate match region comprises: a portion of a bandwidth part (BWP) assigned to the at least one beam in a frequency domain, the portion used for the first SSB transmission; and a duration of the first SSB transmission in a time domain.

Aspect 7: The method of any of Aspects 2-6, wherein the third rate match region comprises: a portion of a bandwidth part (BWP) assigned to the at least one beam in a frequency domain, wherein the portion includes another set of frequencies of the BWP used for the second SSB transmission and an additional set of frequencies at least one of above or below the other set of frequencies; and a period including a duration of the second SSB transmission in a time domain and additional duration at least one of before or after the duration.

Aspect 8: The method of Aspect 7, wherein the additional set of frequencies and the additional duration is based on frequency compensation values for the at least one beam and the neighboring beam.

Aspect 9: The method of any of Aspects 2-8, further comprising: receiving a bitmap pattern configuring the rate matching pattern for the at least one beam, wherein for each SSB transmission of a beam of the plurality of beams, the bitmap pattern indicates at least one of the first rate match region, the second rate match region, the third rate match region, or no rate matching.

Aspect 10: The method of Aspect 9, wherein the bitmap pattern configures at least one additional rate matching pattern for a different beam of the plurality of beams.

Aspect 11: The method of Aspect 9 or 10, further comprising receiving the bitmap pattern as part of a system information block (SIB).

Aspect 12: The method of any of Aspects 9-11, further comprising: receiving a phase continuity indicator corresponding to each configuration of the first rate match region, wherein the phase continuity indicator indicates whether the UE is to determine a new channel estimation after a duration of the first rate match region.

Aspect 13: The method of Aspect 12, wherein the bitmap pattern and the phase continuity indicator are jointly encoded.

Aspect 14: The method of any of Aspects 2-13, wherein the rate matching pattern for the at least one beam is defined by a control resource set (CORESET), further comprising receiving a configuration information for the CORESET, the configuration information comprising: an identifier of the CORESET; an indication of frequency domain resources of the CORESET; an indication of a contiguous time duration of the CORESET; and a search space set indicating orthogonal frequency division multiplexing (OFDM) symbols of at least one of the first, second or third rate match regions.

Aspect 15: The method of Aspect 14, further comprising: receiving a phase continuity indicator corresponding to each configuration of the first rate match region, wherein the phase continuity indicator indicates whether the UE is to determine a new channel estimation after a duration of the first rate match region.

Aspect 16: The method of any of Aspects 2-15, further comprising receiving configuration information configuring the rate matching pattern for the at least one beam, wherein for at least one of the first, second or third rate match regions, the configuration information comprising: a frequency offset including a resource block index; a time offset including an orthogonal frequency division multiplexing (OFDM) symbol index, wherein a combination of the frequency offset and time offset indicates a lower left corner of the rate match region; a frequency interval as a number of resource blocks, the frequency interval indicating frequency domain resources of the rate match region; and a time interval as a number of OFDM symbols, the time interval indicating time domain resources of the rate match region.

Aspect 17: The method of Aspect 16, further comprising receiving a periodicity indicator indicating a repetition pattern for the rate match region.

Aspect 18: The method of Aspect 16 or 17, further comprising: receiving a phase continuity indicator corresponding to each configuration of the first rate match region, wherein the phase continuity indicator indicates whether the UE is to determine a new channel estimation after a duration of the first rate match region.

Aspect 19: A method for wireless communication by a network entity, comprising: determining a beam-specific rate matching pattern for at least one beam of a plurality of beams configured for a user equipment (UE), wherein a synchronization signal block (SSB) transmission corresponding to each of the plurality of beams is configured using the same set of frequencies; transmitting configuration information indicating the beam-specific rate matching pattern; and transmitting a data channel using the at least one beam based on the rate matching pattern.

Aspect 20: The method of Aspect 19, wherein the rate matching pattern defines at least one of: a first rate match region corresponding to a first SSB transmission for the at least one beam when the set of frequencies is not contained within frequency resources assigned for receiving the data channel on the at least one beam; a second rate match region corresponding to the first SSB transmission for the at least one beam when the set of frequencies is contained within the frequency resources assigned for receiving the data channel of the at least one beam; or a third rate match region corresponding to a second SSB transmission for a neighboring beam of the plurality of beams when the set of frequencies is contained within the frequency resources assigned for receiving the data channel of the at least one beam, wherein the data channel is rate matched around at least one of the first, second or third rate match regions.

Aspect 21: The method of Aspect 20, wherein the first rate match region comprises: an entire bandwidth part (BWP) assigned to the at least one beam in a frequency domain; and a duration of the first SSB transmission, a first guard period and a second guard period, in a time domain.

Aspect 22: The method of Aspect 20 or 21, wherein the second rate match region comprises: a portion of a bandwidth part (BWP) assigned to the at least one beam in a frequency domain, the portion used for the first SSB transmission; and a duration of the first SSB transmission in a time domain.

Aspect 23: The method of any of Aspects 20-22, wherein the third rate match region comprises: a portion of a bandwidth part (BWP) assigned to the at least one beam in a frequency domain, wherein the portion includes another set of frequencies of the BWP used for the second SSB transmission and an additional set of frequencies at least one of above or below the other set of frequencies; and a period including a duration of the second SSB transmission in a time domain and additional duration at least one of before or after the duration.

Aspect 24: The method of any of Aspects 20-23, wherein transmitting the configuration information comprises: transmitting a bitmap pattern configuring the rate matching pattern for the at least one beam, wherein for each SSB transmission of a beam of the plurality of beams, the bitmap pattern indicates at least one of the first rate match region, the second rate match region, the third rate match region or no rate matching.

Aspect 25: The method of Aspect 24, further comprising: transmitting a phase continuity indicator corresponding to each configuration of the first rate match region, wherein the phase continuity indicator indicates whether a UE served by the network entity is to determine a new channel estimation after a duration of the first rate match region.

Aspect 26: The method of Aspect 25, where the phase continuity indicator indicates the UE served by the network entity is to determine the new channel estimation after the duration of the first rate match region, further comprising: configuring additional demodulation reference signals (DMRSs) after the duration of the first rate match region.

Aspect 27: The method of any of Aspects 20-26, further comprising transmitting the configuration information configuring the rate matching pattern for the at least one beam, wherein for at least one of the first, second or third rate match regions, the configuration information comprises: a first bitmap defining frequency resources with a granularity of resource blocks; and a second bitmap defining a time duration with a granularity of orthogonal frequency division multiplexing (OFDM) symbols.

Aspect 28: The method of Aspect 27, further comprising: transmitting a phase continuity indicator corresponding to each configuration of the first rate match region, wherein the phase continuity indicator indicates whether a UE served by the network entity is to determine a new channel estimation after a duration of the first rate match region.

Aspect 29: An apparatus for wireless communication by a user equipment (UE), comprising: a memory and at least one processor coupled to the memory, the memory and the least one processor being configured to perform the method of any of Aspects 1-18.

Aspect 30: An apparatus comprising at least one means for performing the method of any of Aspects 1-18.

Aspect 31: A computer readable medium storing computer executable code thereon for wireless communications that, when executed by at least one processor, cause an apparatus to perform the method of any of Aspects 1-18.

Aspect 32: An apparatus for wireless communication by a network entity, comprising: a memory and at least one processor coupled to the memory, the memory and the least one processor being configured to perform the method of any of Aspects 19-28.

Aspect 33: An apparatus comprising at least one means for performing the method of any of Aspects 19-28.

Aspect 34: A computer readable medium storing computer executable code thereon for wireless communications that, when executed by at least one processor, cause an apparatus to perform the method of any of Aspects 19-28.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6 and/or FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. An apparatus for wireless communication by a user equipment (UE), comprising:
a memory; and
at least one processor coupled with the memory and configured to:
receive configuration information indicating a beam-specific rate matching pattern for at least one beam of a plurality of beams configured for the UE, wherein the beam-specific rate matching pattern indicates one of different rate match modes associated with different rate match regions for the at least one beam or no rate matching;
receive a data channel using the at least one beam; and
process the data channel based on the beam-specific rate matching pattern.

2. The apparatus of claim 1, wherein:
one or more synchronization signal block (SSB) transmissions corresponding to one or more of the plurality of beams are configured using a same set of frequencies; and
the beam-specific rate matching pattern defines at least one of:
a first rate match region corresponding to a first SSB transmission of the one or more SSB transmissions for the at least one beam when the set of frequencies is not contained within frequency resources assigned for receiving the data channel on the at least one beam;
a second rate match region corresponding to the first SSB transmission for the at least one beam when the set of frequencies is contained within the frequency resources assigned for receiving the data channel of the at least one beam; or
a third rate match region corresponding to a second SSB transmission of the one or more SSB transmissions for a neighboring beam of the plurality of beams when the set of frequencies is contained within the frequency resources assigned for receiving the data channel of the at least one beam,
wherein the data channel is rate matched around at least one of the first, second or third rate match regions.

3. The apparatus of claim 2, wherein the first rate match region comprises:
an entire bandwidth part (BWP) assigned to the at least one beam in a frequency domain; and
a duration of the first SSB transmission, a first guard period and a second guard period, in a time domain.

4. The apparatus of claim 3, wherein the first guard period comprises a time taken by the UE to switch from the BWP of the at least one beam to the set of frequencies for receiving the first SSB transmission.

5. The apparatus of claim 3, wherein the second guard period comprises a time taken by the UE to switch back from the set of frequencies to the BWP of the at least one beam.

6. The apparatus of claim 2, wherein the second rate match region comprises:
a portion of a bandwidth part (BWP) assigned to the at least one beam in a frequency domain, the portion used for the first SSB transmission; and
a duration of the first SSB transmission in a time domain.

7. The apparatus of claim 2, wherein the third rate match region comprises:
a portion of a bandwidth part (BWP) assigned to the at least one beam in a frequency domain, wherein the portion includes another set of frequencies of the BWP used for the second SSB transmission and an additional set of frequencies at least one of above or below the other set of frequencies; and
a period including a duration of the second SSB transmission in a time domain and additional duration at least one of before or after the duration.

8. The apparatus of claim 7, wherein the additional set of frequencies and the additional duration is based on frequency compensation values for the at least one beam and the neighboring beam.

9. The apparatus of claim 2, wherein the at least one processor is further configured to:
receive a bitmap pattern configuring the beam-specific rate matching pattern for the at least one beam, wherein for the one or more SSB transmissions corresponding to the one or more of the plurality of beams, the bitmap pattern indicates at least one of the first rate match region, the second rate match region, the third rate match region, or no rate matching.

10. The apparatus of claim 9, wherein the bitmap pattern configures at least one additional beam-specific rate matching pattern for a different beam of the plurality of beams.

11. The apparatus of claim 9, wherein the at least one processor is further configured to receive the bitmap pattern as part of a system information block (SIB).

12. The apparatus of claim 9, wherein the at least one processor is further configured to:
receive a phase continuity indicator corresponding to each configuration of the first rate match region, wherein the phase continuity indicator indicates whether the UE is to determine a new channel estimation after a duration of the first rate match region.

13. The apparatus of claim 12, wherein the bitmap pattern and the phase continuity indicator are jointly encoded.

14. The apparatus of claim 2, wherein the beam-specific rate matching pattern for the at least one beam is defined by a control resource set (CORESET), wherein the at least one processor is further configured to receive a configuration information for the CORESET, the configuration information comprising:
an identifier of the CORESET;
an indication of frequency domain resources of the CORESET;
an indication of a contiguous time duration of the CORESET; and
a search space set indicating orthogonal frequency division multiplexing (OFDM) symbols of at least one of the first, second or third rate match regions.

15. The apparatus of claim 14, wherein the at least one processor is further configured to:
receive a phase continuity indicator corresponding to each configuration of the first rate match region, wherein the phase continuity indicator indicates whether the UE is to determine a new channel estimation after a duration of the first rate match region.

16. The apparatus of claim 2, wherein the at least one processor is further configured to receive configuration information configuring the beam-specific rate matching pattern for the at least one beam, wherein for at least one of the first, second or third rate match regions, the configuration information comprising:
a frequency offset including a resource block index;
a time offset including an orthogonal frequency division multiplexing (OFDM) symbol index, wherein a combination of the frequency offset and the time offset indicates a lower left corner of a rate match region from the at least one of the first, second or third rate match regions;
a frequency interval as a number of resource blocks, the frequency interval indicating frequency domain resources of the rate match region; and
a time interval as a number of OFDM symbols, the time interval indicating time domain resources of the rate match region.

17. The apparatus of claim 16, wherein the at least one processor is further configured to receive a periodicity indicator indicating a repetition pattern for the rate match region.

18. The apparatus of claim 16, wherein the at least one processor is further configured to:
receive a phase continuity indicator corresponding to each configuration of the first rate match region, wherein the phase continuity indicator indicates whether the UE is to determine a new channel estimation after a duration of the first rate match region.

19. An apparatus for wireless communication by a network entity, comprising:
a memory; and
at least one processor coupled with the memory and configured to:
determine a beam-specific rate matching pattern for at least one beam of a plurality of beams configured for a user equipment (UE), wherein the beam-specific rate matching pattern indicates one of different rate match modes associated with different rate match regions for the at least one beam or no rate matching;
transmit configuration information indicating the beam-specific rate matching pattern; and transmit a data channel using the at least one beam based on the beam-specific rate matching pattern.

20. The apparatus of claim 19, wherein:
one or more synchronization signal block (SSB) transmissions corresponding to one or more of the plurality of beams are configured using a same set of frequencies; and
the beam-specific rate matching pattern defines at least one of:
a first rate match region corresponding to a first SSB transmission of the one or more SSB transmissions for the at least one beam when the set of frequencies is not contained within frequency resources assigned for receiving the data channel on the at least one beam;
a second rate match region corresponding to the first SSB transmission for the at least one beam when the set of frequencies is contained within the frequency resources assigned for receiving the data channel of the at least one beam; or
a third rate match region corresponding to a second SSB transmission of the one or more SSB transmissions for a neighboring beam of the plurality of beams when the set of frequencies is contained within the frequency resources assigned for receiving the data channel of the at least one beam,
wherein the data channel is rate matched around at least one of the first, second or third rate match regions.

21. The apparatus of claim 20, wherein the first rate match region comprises:
an entire bandwidth part (BWP) assigned to the at least one beam in a frequency domain; and
a duration of the first SSB transmission, a first guard period and a second guard period, in a time domain.

22. The apparatus of claim 20, wherein the second rate match region comprises:
a portion of a bandwidth part (BWP) assigned to the at least one beam in a frequency domain, the portion used for the first SSB transmission; and
a duration of the first SSB transmission in a time domain.

23. The apparatus of claim 20, wherein the third rate match region comprises:
a portion of a bandwidth part (BWP) assigned to the at least one beam in a frequency domain, wherein the portion includes another set of frequencies of the BWP used for the second SSB transmission and an additional set of frequencies at least one of above or below the other set of frequencies; and
a period including a duration of the second SSB transmission in a time domain and additional duration at least one of before or after the duration.

24. The apparatus of claim 20, wherein the at least one processor is configured to transmit the configuration information by transmitting a bitmap pattern configuring the beam-specific rate matching pattern for the at least one beam, wherein for the one or more SSB transmissions corresponding to the one or more of the plurality of beams, the bitmap pattern indicates at least one of the first rate match region, the second rate match region, the third rate match region or no rate matching.

25. The apparatus of claim 24, wherein the at least one processor is further configured to:
transmit a phase continuity indicator corresponding to each configuration of the first rate match region, wherein the phase continuity indicator indicates whether a UE served by the network entity is to determine a new channel estimation after a duration of the first rate match region.

26. The apparatus of claim 25, wherein the phase continuity indicator indicates the UE served by the network entity is to determine the new channel estimation after the duration of the first rate match region, and the at least one processor is further configured to:
configure additional demodulation reference signals (DMRSs) after the duration of the first rate match region.

27. The apparatus of claim 20, wherein the at least one processor is further configured to:
transmit the configuration information configuring the beam-specific rate matching pattern for the at least one beam, wherein for at least one of the first, second or third rate match regions, the configuration information comprises:
a first bitmap defining frequency resources with a granularity of resource blocks; and
a second bitmap defining a time duration with a granularity of orthogonal frequency division multiplexing (OFDM) symbols.

28. The apparatus of claim 27, wherein the at least one processor is further configured to:
transmit a phase continuity indicator corresponding to each configuration of the first rate match region, wherein the phase continuity indicator indicates whether a UE served by the network entity is to determine a new channel estimation after a duration of the first rate match region.

29. A method for wireless communication by a user equipment (UE), comprising:
receiving configuration information indicating a beam-specific rate matching pattern for at least one beam of a plurality of beams configured for the UE, wherein the beam-specific rate matching pattern indicates one of different rate match modes associated with different rate match regions for the at least one beam or no rate matching;
receiving a data channel using the at least one beam; and
processing the data channel based on the beam-specific rate matching pattern.

30. A method for wireless communication by a network entity, comprising:
determining a beam-specific rate matching pattern for at least one beam of a plurality of beams configured for a user equipment (UE), wherein the beam-specific rate matching pattern indicates one of different rate match modes associated with different rate match regions for the at least one beam or no rate matching;
transmitting configuration information indicating the beam-specific rate matching pattern; and
transmitting a data channel using the at least one beam based on the beam-specific rate matching pattern.

* * * * *